June 11, 1929.                R. MASQUELIER                1,717,112
              FRICTION SHOCK ABSORBER FOR SUSPENDING VEHICLES
                          Filed Jan. 28, 1928
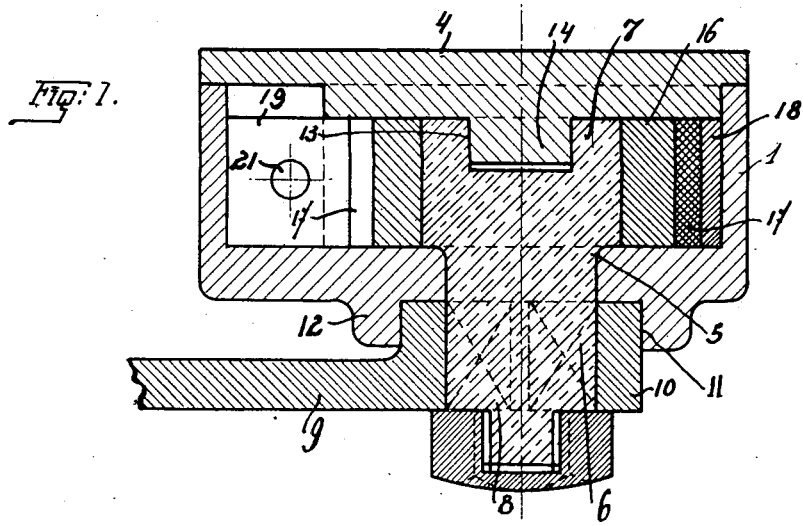
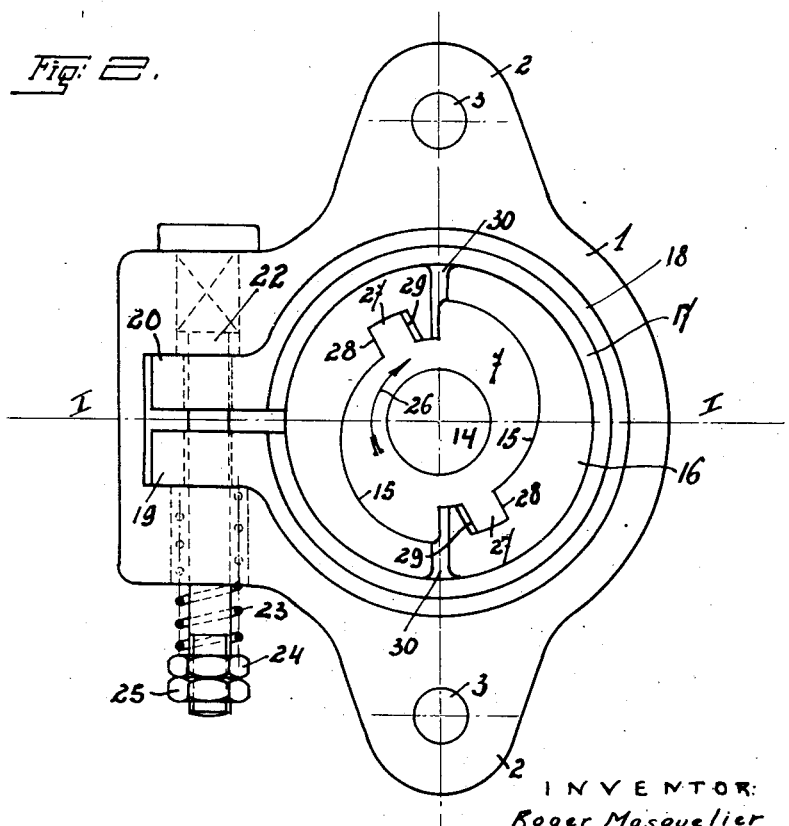
INVENTOR:
Roger Masquelier
BY: *(signature)*
ATTORNEYS.

Patented June 11, 1929.

1,717,112

UNITED STATES PATENT OFFICE.

ROGER MASQUELIER, OF TIRLEMONT, BELGIUM.

FRICTION SHOCK ABSORBER FOR SUSPENDING VEHICLES.

Application filed January 28, 1928, Serial No. 250,307, and in Germany July 19, 1927.

This invention relates to friction shock absorbers for suspending vehicles of the kind in which an eccentric which takes part by a lever to all the movements of the axle relatively to the frame and conversely to all the movements of the frame with respect to the axle, acts on two cams arranged inside a friction band in order to produce the expansion of the cams and their action in the friction band.

It has for its object to secure, in a device of this kind a gradually increasing friction on the whole periphery of the friction band during the first part of the rotation of the eccentric occurring in consequence of a movement of the frame relatively to the axle and thereupon a constant friction during the further rotation of the eccentric through the whole relative movement of the frame to the axle.

With this object in view, the invention essentially consists in the special combinations and arrangements of parts hereinafter fully described and pointed out in the appended claims.

On the annexed drawings:

Fig. 1 is a section of the new shock absorber taken on line I—I, Fig. 2, and

Fig 2 is a view of the device with the cover removed.

As can be seen from the drawing the shock absorber is arranged in a housing 1, which is provided with lugs 2 for securing it to the axle of the vehicle, through holes 3 in which the fastening down screws (not shown) can be passed. This housing 1 is closed at the rear by a cover 4 and has in its front wall an aperture 5 in which the pin of an eccentric 7 engages. The free end of this pin is square as at 8, on which the hub 10 of a lever 9 seats. The latter has its bearing on the inner wall 11 of a flange 12 of the front wall of the housing concentrically disposed to the aperture 5. The eccentric 7 has at its rear end a recess 13 in which engages a pin 14, provided on the cover 4 for the purpose of centering the eccentric.

The eccentric 7 has two eccentric circular surfaces 15, which act on symmetrically disposed cams 16, which on their side abut with their outer surfaces against a friction band 17, which presses against a brake band 18 held in the housing 1. This brake band is not quite closed and terminates in two lugs 19, 20 provided with holes 21 in which a bolt 22 held in the housing is passed. This bolt has with respect to the lug 20 a head, and with respect to the lug 19 a helical spring 23, the tension on which can be regulated by nuts 24 and 25 in such a way that the pressure of this spring tends to push the lugs 19, 20 towards each other, whereby the diameter of the brake band 18 is decreased. In order to limit the pressure and stretching action of the eccentric 7 during its rotation in the direction of the arrow 26, it is provided with two projections or teeth 27 which engage in recesses 28 in the cams 16. These recesses, however, are of greater width than the teeth 27, so that on rotation of the eccentric in the direction of the arrow it presses the cams 16 outwards, whereby the diameter of the friction band 17 is increased. This expansion, however ceases as soon as the side surfaces 29 of the teeth 27 after traversing the play in the recesses 28 reach the opposite surfaces of the latter; in this case the cams 16 move with the eccentric 7 and no longer receive any outward movement. The cams 16 are shaped so that a small intermediate space 30 remains between them.

The operation of the shock absorber described is as follows:

The housing 1 is as already mentioned, secured on the axle and the vehicle frame by means of bolts passed through the holes 3 and the lever 9. When the axle tends to approach the frame, the free play of the vehicle springs is not prevented, because the eccentric rotates contrary, to the arrow 26, and moves the cams which therefore have no action on the friction band 17. When the suspension, on the contrary, tends to bounce, the lever 9 rises and causes a rotation of the eccentric 7 in the direction of the arrow 26. Hereupon the outer surfaces 15 of the eccentric act upon the cams 16 and causes an expansion of the friction band 17 which rubs on the brake band 18. This braking action, however is limited by the fact that after a certain rotation of the eccentric, the side surfaces 29 of the eccentric teeth 27 abut against the surfaces of the recesses 28, whereby the cams 16 are moved. The braking action now constant is therefore dependent on the degree of expansion of the cams 16 and therefore on the friction between the friction band 17 and the brake band 18. This constant friction can be regulated by the pressure of the spring 23 on the brake band 18. In no case can it lead to a locking of the shock absorber device or non-uniform wear of both bands, which condition might occur if the eccentric were to cause an expansion of the friction band to an extent corresponding to the extent of its angle of rotation. The extent to which the shock is to be dampened can therefore be regulated as desired, and without difficulty, without fear of the disadvantages attending hitherto known shock absorbers arising.

What I claim is:

1. In a shock absorber for vehicles, in combination a housing a circular brake band mounted in the said housing, two cams arranged inside the said brake band, an eccentric arranged inside the said cams, means for rotating the said eccentric within the housing whereby the cams are expanded through the said eccentric and pressed against the brake band and means whereby the expanding action of the eccentric on the cams takes place only during a part of the rotation of the eccentric.

2. In a shock absorber for vehicles, in combination with the frame and springs of a vehicle, a housing, means for fixing the said housing to the axle, a circular brake band mounted in the said housing, a friction band cooperating with the said circular brake band, two cams arranged within the said friction band, the said cams being provided with recesses on their inner faces, an eccentric arranged centrally within the said cams, the said eccentric being provided with teeth, the said teeth engaging the said recess with play and means whereby the eccentric is rotated in the housing in case of a movement of the springs relatively to the frame.

3. In a shock absorber for vehicles in combination a brake band, two cams arranged inside the said brake band, and acting on the same, an eccentric disposed inside the said cams, teeth on the periphery of the said eccentric, the said teeth engaging in recesses on the inner periphery of the cams, the said recesses having a greater width than the teeth, whereby an outward movement of the cams and the tension of the brake band is produced during the first part of the rotation of the eccentric whilst on the further rotation the cams are moved with the eccentric, and means whereby the diameter of the said brake band is adapted to be adjusted.

4. In a shock absorber for vehicles in combination, a housing, means whereby the said housing is fixed to vehicle, an aperture in the front wall of the said housing, an eccentric, the pin of which is engaged in the said aperture, two cams symmetrically disposed around the said eccentric, a brake band surrounding the said cams, teeth on the periphery of the said eccentric and cooperating with recesses on the inner periphery of the said cams, the said recesses having a larger width than the teeth, whereby an outward movement of the cams and the tension of the brake band is produced during the first part of the rotation of the eccentric whilst on the further rotation, the cams are moved with the eccentric and means whereby the diameter of the said brake band is adapted to be adjusted.

5. In a shock absorber for vehicles in combination a housing means whereby the said housing is fixed to the axle of the vehicle an aperture in the front wall of the said housing an eccentric, the pin of which is engaged in the said aperture, two cams symmetrically disposed around the said eccentric, a brake band surrounding the cams, teeth on the periphery of the eccentric and cooperating with recesses on the inner periphery of the cams and having a larger width than the said teeth whereby an outward movement for the cams and the tension of the friction band is produced during the first part of the rotation of the eccentric whilst on the further rotation, the cams are moved with the eccentric lugs formed at the ends of the brake band, the said lugs being provided with holes, a bolt passing through the said holes, a helical spring surrounding the said bolt and means for adjusting the pressure of the said spring on the lugs of the brake band, whereby the diameter of the said brake band may be adjusted.

In testimony whereof I have affixed my signature.

ROGER MASQUELIER.